(No Model.) 3 Sheets—Sheet 1.

T. W. MURPHY.
HORSESHOE.

No. 508,114. Patented Nov. 7, 1893.

Witnesses
J. B. McGirr.
Hubert E. Beck

Inventor
Timothy W. Murphy
per E. Duff
Attorney (No Model.)　　　　　　　　T. W. MURPHY.　　　　3 Sheets—Sheet 2.
HORSESHOE.

No. 508,114.　　　　　　　　　　　　　Patented Nov. 7, 1893.

Witnesses　　　　　　　　　　　　　　　Inventor
J. B. McGivr.　　　　　　　　　　　　Timothy W. Murphy
C. M. Werle　　　　　　　　　　　　　per
　　　　　　　　　　　　　　　　　　　Attorney

THE NATIONAL LITHOGRAPHING COMPANY,
WASHINGTON, D. C.

(No Model.) 3 Sheets—Sheet 3.

T. W. MURPHY.
HORSESHOE.

No. 508,114. Patented Nov. 7, 1893.

Witnesses
Inventor
Timothy W. Murphy
per O. E. Duffy
Attorney

UNITED STATES PATENT OFFICE.

TIMOTHY W. MURPHY, OF WASHINGTON, DISTRICT OF COLUMBIA, ASSIGNOR TO THE MURPHY PATENT NAILLESS HORSESHOE COMPANY, OF SAME PLACE.

HORSESHOE.

SPECIFICATION forming part of Letters Patent No. 508,114, dated November 7, 1893.

Application filed February 13, 1893. Serial No. 462,222. (No model.)

*To all whom it may concern:*

Be it known that I, TIMOTHY W. MURPHY, of Washington, in the District of Columbia, have invented certain new and useful Improvements in Horseshoes; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in horse shoes.
The object of the invention is to provide an improved horse shoe exceedingly cheap, simple and durable in construction, and which can be easily applied to or detached from the hoof without in any way injuring the same and without the use of nails or other fastening means driven into or entering the hoof, and which can be so securely fastened and secured on the hoof that there is no danger of accidental loosening or detachment.
A further object of the invention is to provide an improved fastening simple and exceedingly strong and durable, whereby a horse shoe can be securely fastened on the hoof against loss or accidental detachment, without driving into or entering the hoof and without the use of nails, screws, bolts, nuts, or the like.

The invention consists in certain novel features of construction and in combinations of parts more fully hereinafter described and particularly pointed out in the claims.

Figure 1:
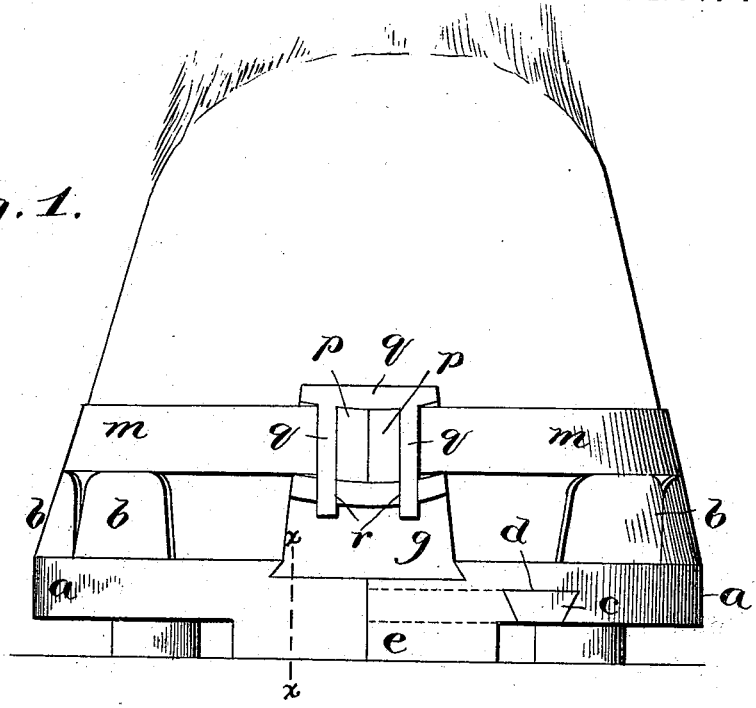
Figure 2:
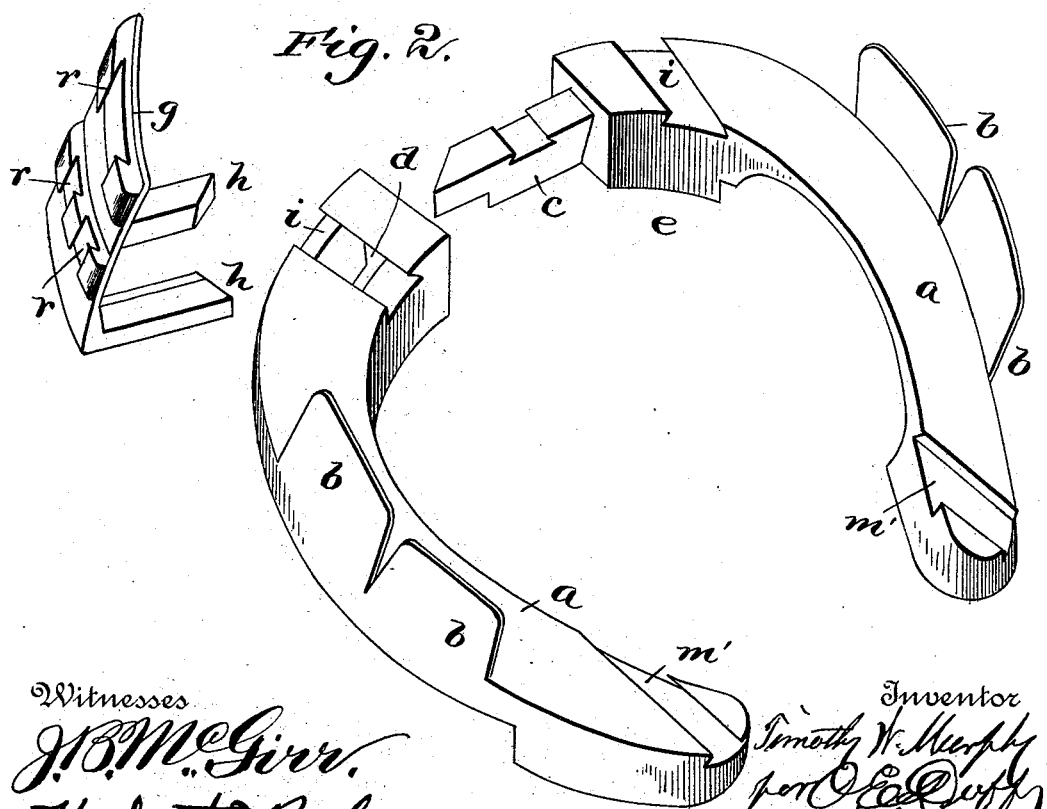
Figure 3:
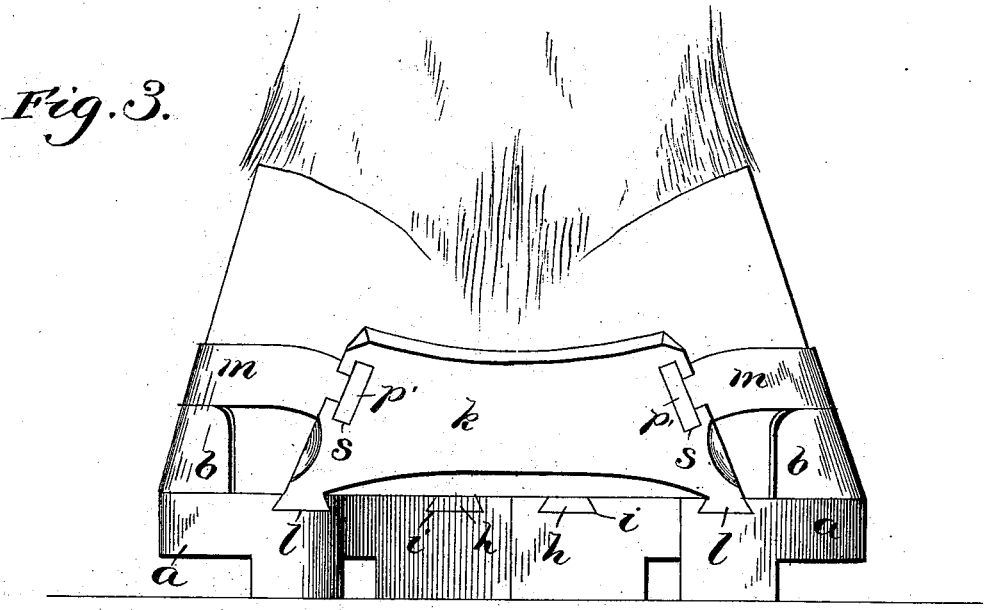
Figures 4, 8:
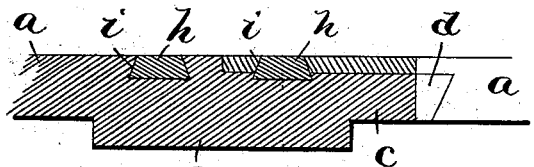
Figures 5, 7:
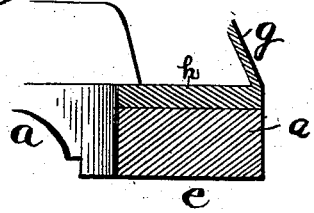
Figure 6:
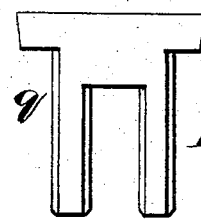
Figure 9:
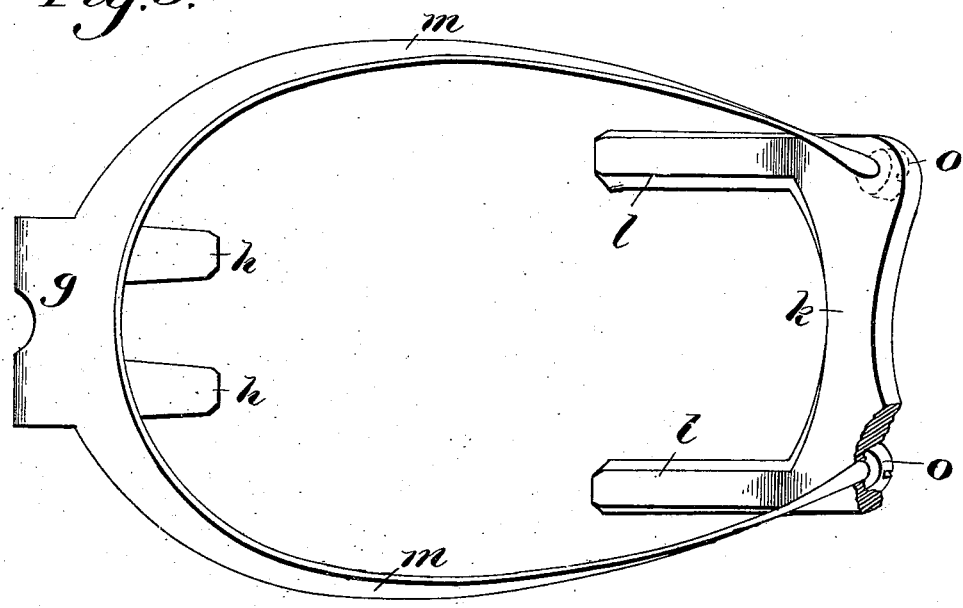
Figure 10:
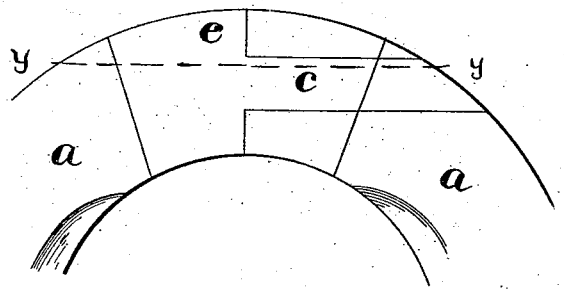
Figure 12:
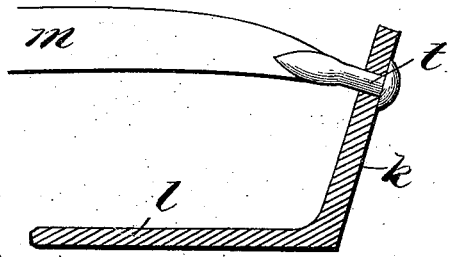
Figure 11:
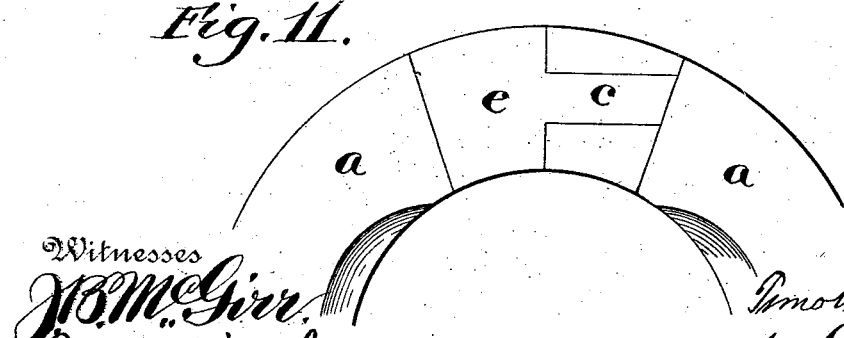

Referring to the accompanying drawings:—Figure 1 is a front view of a horse shoe according to my invention locked on a hoof without the employment of nails, screws, bolts or nuts. Fig. 2 is a detail perspective showing the two sections of the shoe separated and also showing the front lock separated. Fig. 3 is a rear view showing the shoe on the hoof. Fig. 4 is a detail perspective of a fastening band for use in the construction shown in Figs. 1 and 3. Fig. 5 is a detail perspective of the rear lock constructed to receive the fastening band of Fig. 4. Fig. 6 is a detail view of the key employed to lock the front ends of the fastening bands to the plate of the front lock. Fig. 7 is a transverse section of the shoe taken in plane of line $x$—$x$ Fig. 1. Fig. 8 is a section through the shoe at the joint between the sections, taken in the plane of line $y$—$y$ Fig. 10. Fig. 9 is a plan partially broken away showing modified constructions of front and rear locks and fastening bands. Fig. 10 is a detail bottom plan of the toe of the shoe. Fig. 11 is a similar view showing a slightly modified construction. Fig. 12 shows in detail and in section, a modified way of securing the fastening bands to the rear lock.

In the drawings the reference letter $a$, indicates a horse shoe having the side lips or upward projections $b$, arranged to fit and extend up on the exterior of the hoof, and thereby securely retain the shoe on the hoof when fitted thereon and locked. This shoe is, preferably, formed in two sections joined together at the toe to form the complete shoe. Any suitable joint can be provided to rigidly lock the sections together. The preferred form of joint consists of a tenon $c$, integral with and projecting from the end of one section, and arranged to slide and fit in a corresponding mortise or socket $d$, in the corresponding end of the other section. If desired the tenon and mortise can be of such lengths as to permit the tenon to extend through to the outer edge of one section (see Fig. 10), but if desired to increase the strength of the toe of the shoe the mortise and tenon can be of such length that the tenon will not extend beyond the length of the toe calk and the shoe can be solid from the end of the toe calk to the outer edge of the shoe (see Fig. 11). The tenon and mortise are preferably dovetailed as shown so that the two sections of the shoe will be properly held against lateral play and to prevent the tenon dropping down out of the mortise. By means of this joint the sections can be moved laterally toward or from each other to fit the shoe on the hoof, and interlock the sections, or to remove the shoe from the hoof and separate the sections. Any suitable means can be provided to lock the sections together firmly on the hoof. The preferred construction of lock consists of a plate $g$, formed to fit and extend up on the toe of the hoof. This plate is provided with the two parallel keys $h\ h$, extending horizontally and rearwardly from the lower edge. These keys are dovetailed and are arranged to slide and fit in the transverse dovetailed grooves $i\ i$, in the upper faces of the ends of the shoe sections. One of the transverse grooves $i$, opens into the mortise $d$, and the upper edge of the tenon $c$, is notched to receive the key $h$, entering said groove $i$. (See Figs. 2 and 8.)

To more firmly lock the shoe on the hoof I preferably also provide a lock for the heels of the shoe composed of a plate $k$, having the forwardly extending parallel horizontal dovetailed keys $l\ l$, arranged to enter respectively the dovetailed grooves $m$, in the heels of the shoe. Suitable fastenings are provided to secure the front and rear locks in locking position. The preferred manner of accomplishing this result is by means of metallic bands $n\ n$, passing along opposite sides of the hoof and detachably securing the two locks together. There are many different ways of attaching these metallic bands to the locks. For instance in Fig. 9, the metallic bands are shown rigid with the front lock and passing rearwardly on both sides of the hoof with their ends threaded and passing through countersunk holes in the rear lock plate and provided with clamping nuts $o$, $o$, located in the countersunk holes. By this means the front and rear locks are drawn and held firmly and rigidly in their locking positions. It should be observed that when the shoe sections have been interlocked on the hoof, the locks are placed in position so that their keys enter their respective grooves. The two keys rigid with a plate and entering the grooves in the toe ends of the sections rigidly and firmly hold the shoe sections on the hoof and against separation. The rear lock constitutes an additional lock by rigidly uniting the heels of the shoe and holding them against separation. The extreme strength, durability and simplicity of these locks are obvious.

In Figs. 1, 2, 3, 4, 5, and 6, a different way of securing the lock fastening bands is disclosed. In this construction the front ends of the metallic fastening bands $m'$ are provided with the heads $p$, which are arranged to be drawn together and tightly held by the key $q$, having the two separate dovetailed legs which slide down in the raised dovetailed ways $r$, on the plate of the front lock.

In securing the form of fastening the front ends of the bands are placed together on the plate of the front lock, and then the key $q$, is forced down through the dovetailed ways on said plate so that the legs thereof will pass over the bands with the heads $p$, between them, thus most securely locking the front ends of the bands. The rear ends of the bands can be removably or otherwise secured to the rear lock plate in any suitable manner. In Figs. 3, 4, and 5, the metallic fastening bands are provided with suitable heads $p'$ on their rear ends, so that said heads can catch in retaining slots $s\ s$, in the end edges of the rear lock plate as clearly shown. These slots have narrow openings thereinto so that the bands at points in front of the heads can be inserted in the slots but the heads cannot pull through the slots. If preferred the rear ends of the bands can be loosely joined to the rear lock plate by riveting as shown at $t$, in Fig. 12, in which case the front ends of the bands will be detachably secured to the front lock.

The shoe locking and fastening devices can be constructed in any suitable manner, as by casting, stamping by dies, drop forging, &c., and the various parts and portions can be made of any desired shapes and dimensions.

The shoes can be made of various sizes to fit any hoof.

It is evident that various changes might be made in the forms, constructions and arrangements of the parts described without departing from the spirit and scope of my invention. Hence I do not wish to limit myself to the constructions shown, but consider myself entitled to all such changes and variations as fall within the spirit and scope of my invention.

Having thus fully described my invention, what I claim as new, and desire to secure by Letters Patent of the United States, is—

1. A separable horse shoe having heel and toe locks, metallic bands uniting said locks and having heads on their front ends, and a double key removably located in ways on the toe lock and embracing said heads and detachably securing said bands to the lock, substantially as described.

2. A self securing separable horse shoe provided with heel and toe locks arranged to enter the shoe and rigidly hold the sides of the shoe against separating when in securing position, and fastening means securing the locks together, substantially as described.

3. A separable horse shoe having heel and toe locks, metallic bands uniting said locks and detachably secured to the rear lock, substantially as described.

4. A separable horse shoe formed to extend up on the hoof, and provided with a single rigid double key or lock formed to enter opposite sides of the toe of the shoe and rigidly hold the sections of the shoe in clamped position on the hoof, substantially as described.

5. The combination with the two members or sections of a horse shoe, of a double sliding key arranged to enter the corresponding slots or recesses in the members and hold them against separation, substantially as described.

6. The combination with two movable members of a horse shoe having parallel dovetailed ways in their adjacent ends, of a double lock having dovetailed keys arranged to enter said ways and hold the members against independent lateral movement.

7. An expansible horse shoe formed of two sections interlocking at the toe and provided with the sliding lock having the two parallel keys arranged to enter the ends of the sections and hold them against separation, and a fastening for such lock, substantially as described.

8. The horse shoe formed of two sections, one section having the tenon, and the other the mortise to receive the tenon, and the double key entering both sections and holding them against separation.

9. A horse shoe formed of separable sections, the sliding heel and toe, double keys arranged to enter the sections and hold them against separation, and metallic bands detachably uniting said keys together and in position, substantially as described.

10. An expansible horse shoe having the heel and toe keys arranged to enter and hold the shoe rigid when fitted on the hoof, and metallic bands passed around the hoof and at their ends detachably secured to said keys to hold them in position, substantially as described.

11. A horse shoe formed of the sections having the upwardly extending lips to fit on the hoof, the heel and toe locks, each consisting of a plate having two keys to enter grooves in the respective sections and hold them against separation, and the metallic bands passing around the hoof and secured to said plates to hold the keys in the grooves, substantially as described.

12. A horse shoe formed in two sections, one section having a dovetailed mortise at its toe end and the other having a dovetailed tenon at its corresponding end to enter said mortise, and a sliding key entering the mortise and tenon and thereby firmly locking the two sections of the shoe together, substantially as described.

13. A separable horse shoe formed to fit up on the hoof and hold the same thereon without the use of nails, and a rigid detachable lock engaging the sections of the shoe and rigidly holding them against separation, substantially as described.

14. A horse shoe formed in two sections to interlock at the toe, the sections provided with parallel dovetailed ways at their toe ends opening through the front edge of the shoe, and the plate formed to fit on the hoof and provided with the dovetailed keys to enter said ways and hold the sections against separation, and fastening means substantially as described to hold said plate, substantially as described.

15. The horse shoe formed in two sections, one section having the tenon projecting from its end, the other end having the mortise to receive said tenon, the way or groove extending across one section and opening into said mortise, the upper face of the tenon being grooved to register with said way, and a key to fit in said way and in the tenon and thereby lock the parts together, substantially as described.

16. A separable horse shoe having the rigid upwardly extending lips from its outer edge to fit the hoof and hold the shoe thereon without the use of nails or bolts, heel and toe locks to engage the sections of the shoe and rigidly hold them against separation, and metallic bands detachably uniting the locks to hold them in locking position, substantially as described.

In testimony that I claim the foregoing as my own I affix my signature in presence of two witnesses.

TIMOTHY W. MURPHY.

Witnesses:
O. E. DUFFY,
HERBERT E. PECK.